United States Patent
Hashimoto et al.

(10) Patent No.: US 11,824,313 B2
(45) Date of Patent: Nov. 21, 2023

(54) CONNECTION TERMINAL AND CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yuki Hashimoto, Mie (JP); Katsuhiko Aizawa, Mie (JP); Akihiro Hayashi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 81 days.

(21) Appl. No.: 17/608,308

(22) PCT Filed: May 1, 2020

(86) PCT No.: PCT/JP2020/018437
§ 371 (c)(1),
(2) Date: Nov. 2, 2021

(87) PCT Pub. No.: WO2020/230672
PCT Pub. Date: Nov. 19, 2020

(65) Prior Publication Data
US 2022/0216654 A1    Jul. 7, 2022

(30) Foreign Application Priority Data
May 14, 2019 (JP) ................... 2019-091645

(51) Int. Cl.
*H01R 13/66* (2006.01)
*H01R 13/10* (2006.01)

(52) U.S. Cl.
CPC ............. *H01R 13/66* (2013.01); *H01R 13/10* (2013.01); *H01R 2201/26* (2013.01)

(58) Field of Classification Search
CPC ..... H01R 13/66; H01R 13/10; H01R 2201/26
(Continued)

(56) References Cited

U.S. PATENT DOCUMENTS 10,618,418 B2 * 4/2020 Turik ...................... B60L 53/16
10,943,711 B2 * 3/2021 Heyne .................... H01B 9/006
(Continued)

FOREIGN PATENT DOCUMENTS

JP    2018-026273 A    2/2018

OTHER PUBLICATIONS

International Search Report dated Jun. 30, 2020 for WO 2020/230672 A1 (4 pages).

*Primary Examiner* — Alexander Gilman
(74) *Attorney, Agent, or Firm* — Venjuris, P.C.

(57) ABSTRACT

The present disclosure provides a connection terminal and a connector capable of suppressing a temperature increase during energization. A vehicle-side connector 10 includes a vehicle-side terminal 50 made of metal and a heat storage body 60 held in the vehicle-side terminal 50. The vehicle-side terminal 50 includes a terminal connecting portion 51 to be electrically connected to a charger-side terminal 82, a wire connecting portion 54 to be electrically connected to a wire 70 and a holding portion 56 integrally formed to the terminal connecting portion 51 and the wire connecting portion 54. The heat storage body 60 is held in the holding portion 56.

8 Claims, 7 Drawing Sheets

(58) Field of Classification Search
USPC .......................................................... 439/487
See application file for complete search history.

(56) References Cited

U.S. PATENT DOCUMENTS

| | | | |
|---|---|---|---|
| 10,953,761 B2* | 3/2021 | Arai | B60L 53/302 |
| 11,285,832 B2* | 3/2022 | Rhodes | B60L 53/302 |
| 2014/0216027 A1 | 8/2014 | Iida et al. | |
| 2015/0217654 A1* | 8/2015 | Woo | B60L 53/16 |
| | | | 320/109 |
| 2019/0020140 A1* | 1/2019 | Fuehrer | H01R 13/04 |
| 2019/0109409 A1* | 4/2019 | Fuehrer | H01R 13/533 |
| 2019/0322186 A1* | 10/2019 | Arai | H01B 9/00 |
| 2019/0344674 A1* | 11/2019 | Arai | B60L 53/16 |
| 2019/0385765 A1* | 12/2019 | Lyon | B60L 53/16 |
| 2023/0032999 A1* | 2/2023 | Uki | H01R 13/02 |

* cited by examiner

CONNECTION TERMINAL AND CONNECTOR

CROSS REFERENCE TO RELATED APPLICATIONS

This application is a national phase of PCT application No. PCT/JP2020/018437, filed on 1 May 2020, which claims priority from Japanese patent application No. 2019-091645, filed on 14 May 2019, all of which are incorporated herein by reference.

TECHNICAL FIELD

The present disclosure relates to a connection terminal and a connector.

BACKGROUND

Conventionally, a vehicle such as a plug-in hybrid vehicle or electric vehicle includes a charging connector for charging an installed power storage device (see, for example, Patent Document 1). The vehicle of this type includes various harnesses and various connectors having terminal connecting portions for connecting the harnesses as members for electrically connecting the charging connector and the power storage device.

PRIOR ART DOCUMENT

Patent Document

Patent Document 1: JP 2018-026273 A

SUMMARY OF THE INVENTION

Problems to be Solved

In the above connector, a large current is required for a larger capacity of the installed power storage device, the shortening of a charging time and the like. However, if the large current is used, a temperature of the connector is increased by heat generation in the terminal connecting portions of the connector caused by energization. Thus, it is desired to suppress a temperature increase during energization in connectors including terminal connecting portions such as a charging connector.

The present disclosure aims to provide a connection terminal and a connector capable of suppressing a temperature increase during energization.

Means to Solve the Problem

The present disclosure is directed to a connection terminal with a terminal made of metal, and a heat storage body held in or on the terminal, wherein the terminal includes a terminal connecting portion to be electrically connected to a mating terminal, a wire connecting portion to be electrically connected to a wire, and a holding portion integrally formed to the terminal connecting portion and the wire connecting portion, and the heat storage body is held in or on the holding portion.

Effect of the Invention

According to the connection terminal of the present disclosure, an effect of being capable of suppressing a temperature increase during energization is achieved.

DETAILED DESCRIPTION TO EXECUTE THE INVENTION

Description of Embodiments of Present Disclosure

Figure 1:
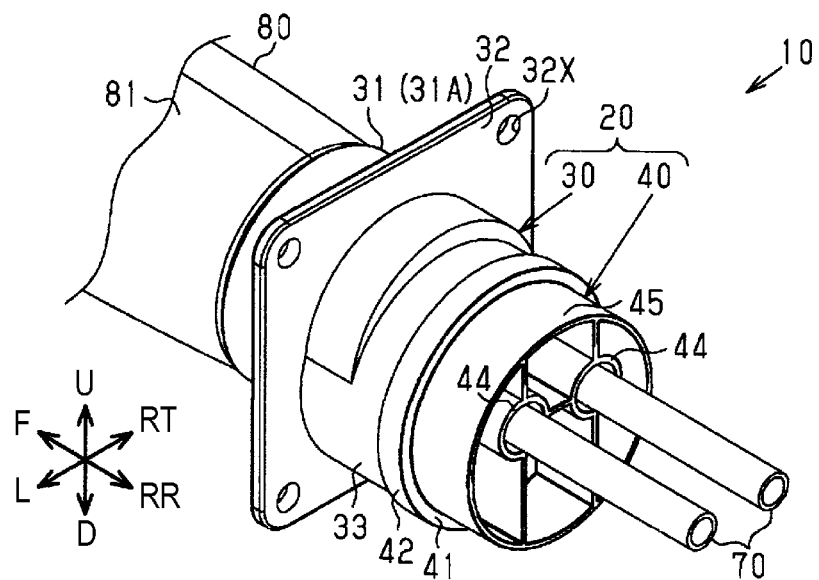
FIG. 1 is a schematic perspective view showing a connector of one embodiment.

First, embodiments of the present disclosure are listed and described.

[1] The connection terminal of the present disclosure includes a terminal made of metal, and a heat storage body held in or on the terminal, wherein the terminal includes a terminal connecting portion to be electrically connected to a mating terminal, a wire connecting portion to be electrically connected to a wire, and a holding portion integrally formed to the terminal connecting portion and the wire connecting portion, and the heat storage body is held in or on the holding portion.

According to this configuration, the terminal generates heat due to a current flowing during use. At this time, the heat generated in the terminal can be absorbed by the heat storage body held in or on the holding portion of the terminal. In this way, a sudden temperature increase of the terminal can be suppressed.

[2] Preferably, the holding portion is provided between the terminal connecting portion and the wire connecting portion. According to this configuration, the heat storage body is provided between the terminal connecting portion and the wire connecting portion. Thus, the heat storage body can be provided near both the terminal connecting portion and the wire connecting portion. Here, in the terminal, heat is easily generated in the terminal connecting portion connected to the mating terminal and the wire connecting portion connected to the wire. Since the heat storage body can be provided near both the terminal connecting portion and the wire connecting portion, heat generated in the terminal connecting portion and the wire connecting portion can be efficiently absorbed by the heat storage body. In this way, a sudden temperature increase of the terminal can be suppressed.

[3] Preferably, the heat storage body is held inside the holding portion. According to this configuration, the heat storage body is arranged inside the holding portion. In this way, the heat storage body can be held in the holding portion without covering an outer surface of the holding portion. Thus, even if the heat storage body is provided, it can be suppressed that heat dissipation from the outer surface of the holding portion is blocked by the heat storage body. For example, if the connection terminal is held in a connector housing, the outer surface of the holding portion can be brought into contact with the connector housing. Thus, the heat generated in the terminal can be transferred to the connector housing through the outer surface of the holding portion of the terminal. In this way, the heat generated in the terminal can be efficiently released to the atmosphere from the outer surface of the connector housing. Therefore, the heat generated in the terminal can be efficiently dissipated.

[4] The heat storage body includes a case held in or on the holding portion, and a heat storage material accommodated inside the case. According to this configuration, the heat generated in the terminal can be absorbed by the heat storage material accommodated inside the case. In this way, a sudden temperature increase of the terminal can be suppressed. Further, since the heat storage material can be accommodated in the case separate from the terminal, the heat storage body can be handled separately from the terminal. In this way, the handleability of the heat storage body can be improved.

[5] Preferably, the case is made of a thermally expandable material. According to this configuration, the case made of the thermally expandable material expands, for example, due to heat transferred from the terminal. In this way, the case can be suitably held in close contact with the holding portion. As a result, heat transferability between the terminal and the heat storage body can be enhanced. Thus, the heat generated in the terminal can be efficiently absorbed by the heat storage material of the heat storage body and a temperature increase of the terminal can be more effectively suppressed.

[6] Preferably, the holding portion is formed into a tubular shape, and the heat storage body is provided in an internal space of the holding portion. According to this configuration, the heat storage body can be held in the holding portion by inserting the heat storage body into the internal space of the tubular holding portion.

[7] Preferably, the holding portion includes a projecting piece projecting in a direction intersecting an arrangement direction of the terminal connecting portion and the wire connecting portion, and the holding portion holds the heat storage body by crimping the projecting piece to an outer surface of the heat storage body.

According to this configuration, the heat storage body can be held in or on the holding portion by crimping the projecting piece to the outer surface of the heat storage body. In this way, the projecting piece can be suitably held in close contact with the outer surface of the heat storage body. As a result, heat transferability between the terminal and the heat storage body can be enhanced. Thus, the heat generated in the terminal can be efficiently absorbed by the heat storage body and a temperature increase of the terminal can be more effectively suppressed.

[8] Preferably, the holding portion includes a bottom wall extending between the terminal connecting portion and the wire connecting portion and a side wall standing on the bottom wall, and the heat storage body includes an engaging portion to be engaged with the side wall.

According to this configuration, the heat storage body can be held on the holding portion by engaging the engaging portion of the heat storage body with the side wall of the holding portion. In this way, the heat storage body can be easily held on the holding portion.

A connector of the present disclosure preferably includes the connection terminal of any one of [1] to [8] described above, and a connector housing for holding the connection terminal. According to this configuration, the amount of heat transferred from the terminal to the connector housing can be reduced by absorbing the heat generated in the terminal by the heat storage body. Thus, a sudden temperature increase of the connector housing can be suppressed.

Details of Embodiment of Present Disclosure

A specific example of a connector of the present disclosure is described below with reference to the drawings. In each figure, some of components may be shown in an exaggerated or simplified manner for the convenience of description. A dimensional ratio of each part may be different in each figure. Note that the present invention is not limited to these illustrations and is intended to be represented by claims and include all changes in the scope of claims and in the meaning and scope of equivalents.

Schematic Configuration of Vehicle-Side Connector 10

A vehicle-side connector 10 shown in FIG. 1 is for charging a power storage device (not shown) installed in a vehicle V (see FIG. 2) such as an electric vehicle or plug-in hybrid vehicle.

Figure 2:
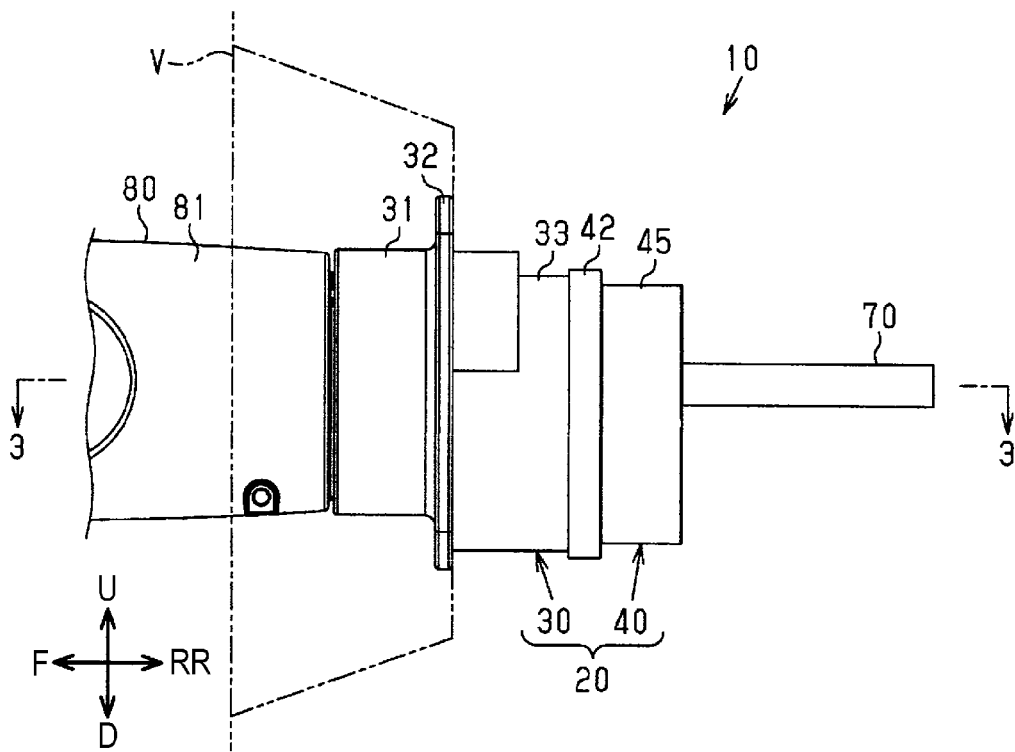
FIG. 2 is a schematic side view showing the connector of the one embodiment.

As shown in FIG. 2, the vehicle-side connector 10 is fixed to the vehicle V by fastening members (not shown) such as bolts. The vehicle-side connector 10 is connected to the power storage device (not shown) via wires 70.

Figure 3:
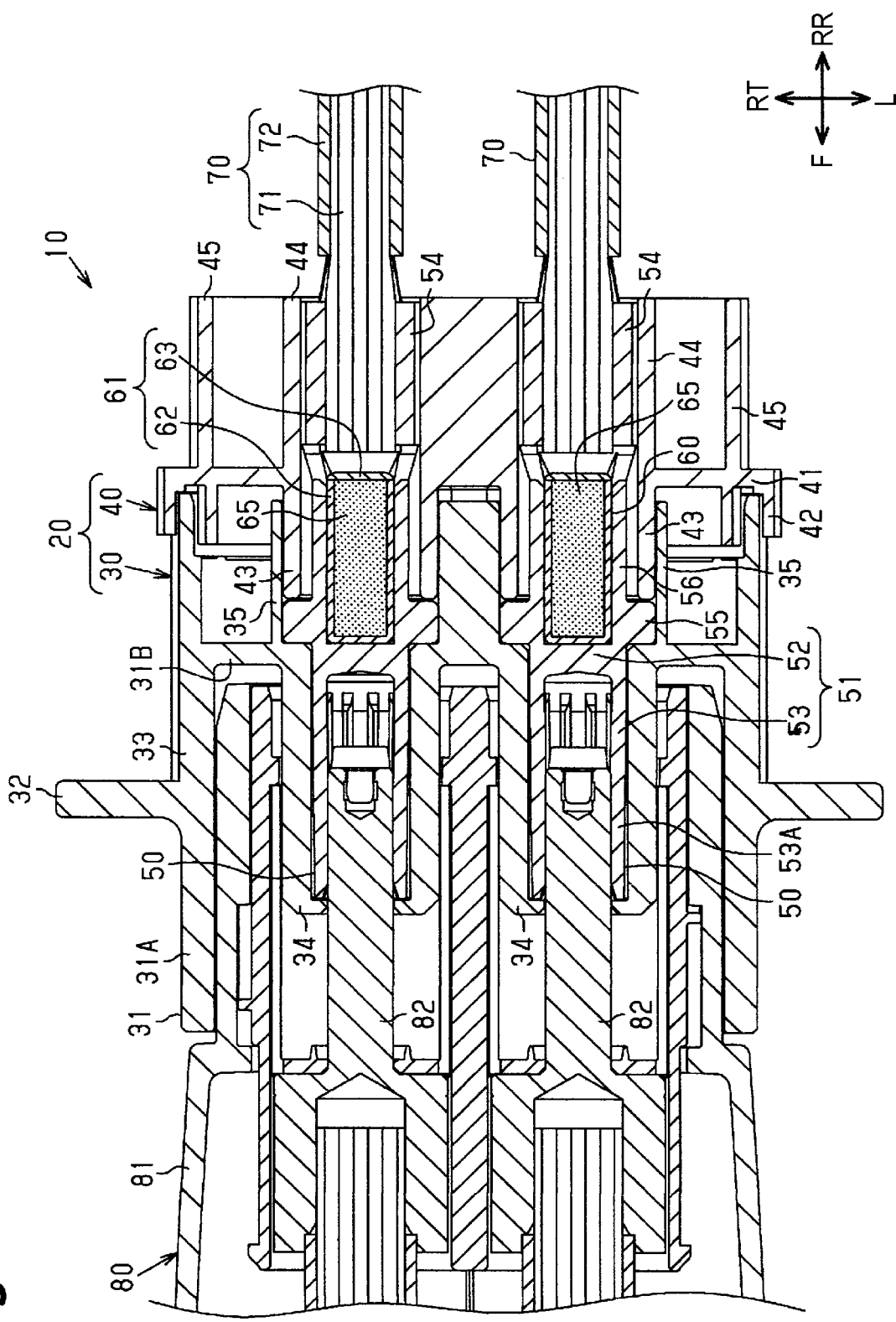
FIG. 3 is a schematic section (section along 3-3 in FIG. 2) showing the connector of the one embodiment.

As shown in FIGS. 2 and 3, a charger-side connector 80 is connected as a mating connector to the vehicle-side connector 10. In an example shown in FIGS. 2 and 3, the charger-side connector 80 is connected to the vehicle-side connector 10 from a left side. The left side in FIGS. 2 and 3 is the outside of the vehicle, i.e. the outside of a vehicle interior. Further, a lateral direction in FIGS. 2 and 3 is an inserting/withdrawing direction of the charger-side connector 80. In the following description, the lateral direction in FIGS. 2 and 3 is referred to as a front-rear direction, a vertical direction in FIG. 2 is referred to as a vertical direction and a vertical direction in FIG. 3 is referred to as a lateral direction. Further, in the following description, a left side of FIG. 2 is referred to as a front side, a right side of FIG. 2 is referred to as a rear side, an upper side of FIG. 2 is referred to as an upper side, a lower side of FIG. 2 is referred to as a lower side, an upper side of FIG. 3 is referred to as a right side, and a lower side of FIG. 3 is referred to as a left side.

Specific Configuration of Vehicle-Side Connector 10

As shown in FIG. 3, the vehicle-side connector 10 includes a connector housing 20, one or more (two in this embodiment) vehicle-side terminals 50 and heat storage bodies 60. The connector housing 20 includes a housing body 30 and a retainer 40.

Configuration of Housing Body 30

The housing body 30 is made of insulating synthetic resin. The housing body 30 includes a fitting portion 31, a flange portion 32, a tube portion 33, one or more (two in this embodiment) terminal accommodating portions 34, and one or more (two in this embodiment) terminal holding portions 35.

The fitting portion 31 is, for example, formed into a tubular shape. The charger-side connector 80 is inserted into the fitting portion 31. Here, the charger-side connector 80 includes a connector housing 81 and charger-side terminals 82 held in the connector housing 81. A tip part (here, a rear end part) of the connector housing 81 is fit into the fitting portion 31. The fitting portion 31 is, for example, in the form of a bottomed tube. The fitting portion 31 of this embodiment is in the form of a bottomed hollow cylinder with an open front end part. The fitting portion 31 includes, for example, a hollow cylindrical receptacle 31A and a back wall portion 31B closing the rear end of the receptacle 31A.

As shown in FIG. 1, the flange portion 32 is formed to project radially outwardly of the receptacle 31A from the outer peripheral surface of the receptacle 31A. The flange portion 32 is, for example, formed to project radially outward over the entire periphery in a circumferential direction of the receptacle 31A. The flange portion 32 of this embodiment is in the form of a substantially rectangular plate. The flange portion 32 includes a plurality of mounting holes 32X penetrating through the flange portion 32 in a plate thickness direction (here, front-rear direction). The fastening members (not shown) such as bolts are inserted into the respective mounting holes 32X. The vehicle-side connector 10 is fixed to the vehicle V (see FIG. 2) by these fastening members.

The tube portion 33 extends rearward from the flange portion 32. The tube portion 33 of this embodiment is formed into a substantially hollow cylindrical shape. As shown in FIG. 2, the tube portion 33 of this embodiment is provided at a position shifted downward with respect to the fitting portion 31.

As shown in FIG. 3, each terminal accommodating portion 34 extends forward from the back wall portion 31B. Each terminal accommodating portion 34 is, for example, formed into a tubular shape. Each terminal accommodating portion 34 of this embodiment is formed into a hollow cylindrical shape. The two terminal accommodating portions 34 are, for example, provided side by side in the lateral direction of the vehicle-side connector 10.

Each terminal holding portion 35 extends rearward from the back wall portion 31B. Each terminal holding portion 35 is, for example, formed into a tubular shape. Each terminal holding portion 35 of this embodiment is formed into a hollow cylindrical shape having an inner diameter larger than an inner diameter of each terminal accommodating portion 34. The respective terminal holding portions 35 are, for example, provided on the same axes as the respective terminal accommodating portions 34. Internal spaces of the respective terminal holding portions 35 communicate, for example, with internal spaces of the respective terminal accommodating portions 34. The vehicle-side terminals 50 are inserted into these terminal accommodating portions 34 and terminal holding portions 35. That is, the respective terminal accommodating portions 34 and the respective terminal holding portions 35 constitute terminal accommodation tubes for accommodating the vehicle-side terminals 50.

Configuration of Vehicle-Side Terminal 50

Figure 4:
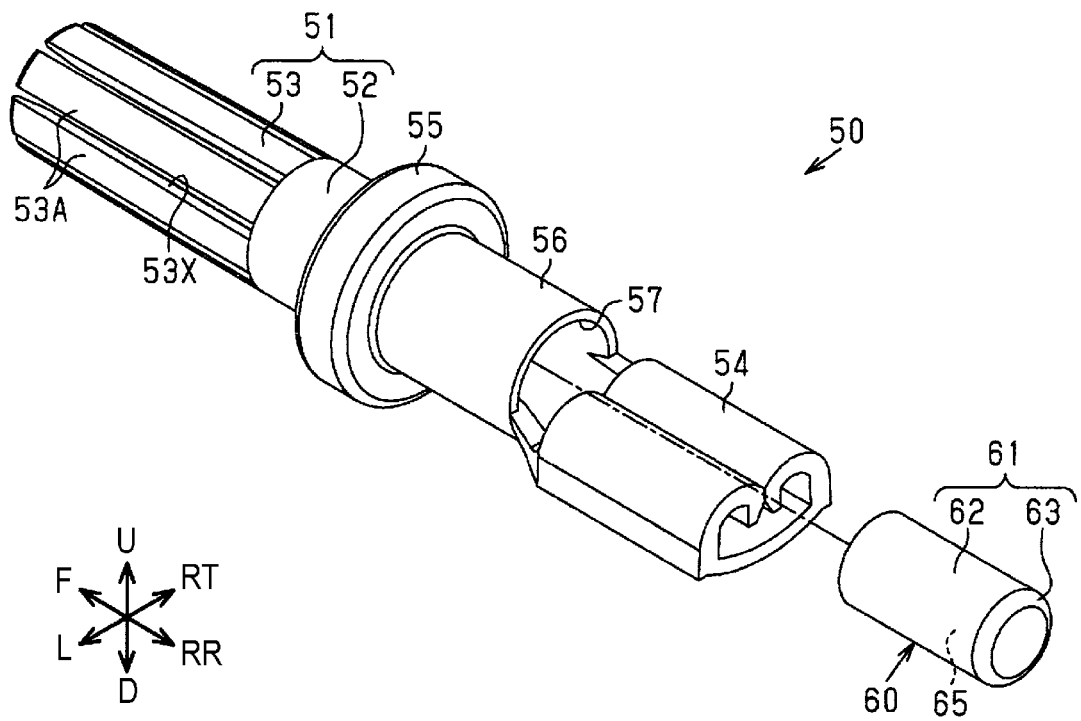
FIG. 4 is a schematic exploded perspective view showing a vehicle-side terminal of the one embodiment.
Figure 5:
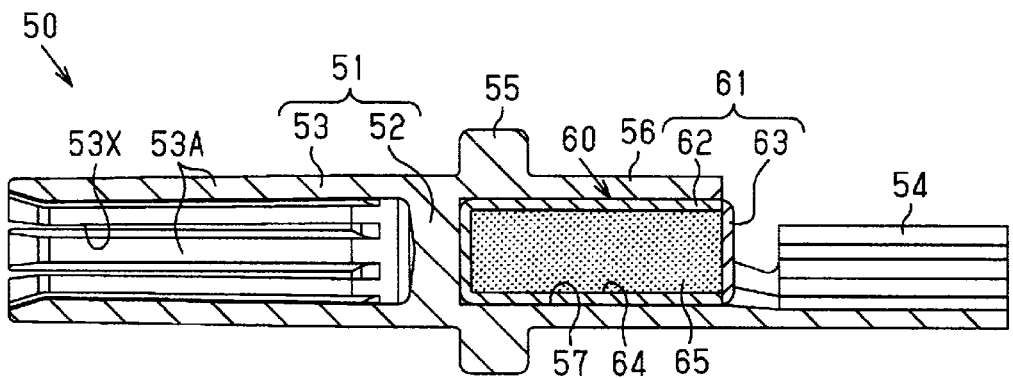
FIG. 5 is a schematic section showing the vehicle-side terminal of the one embodiment.

As shown in FIGS. 4 and 5, each vehicle-side terminal 50 includes, for example, a terminal connecting portion 51 to be electrically connected to the charger-side terminal 82 (see FIG. 3) as a mating terminal, and a wire connecting portion 54 to be electrically connected to the wire 70 (see FIG. 3). Each vehicle-side terminal 50 includes a locking portion 55 and a holding portion 56 provided between the terminal connecting portion 51 and the wire connecting portion 54. Each vehicle-side terminal 50 is, for example, a single component in which the terminal connecting portion 51, the locking portion 55, the holding portion 56 and the wire connecting portion 54 are integrally formed while being connected in the front-rear direction. A metal material such as copper, copper alloy, aluminum, aluminum alloy or stainless steel can be, for example, used as a material of each vehicle-side terminal 50. Surface processing such as silver plating, tin plating or aluminum plating may be applied to each vehicle-side terminal 50 according to the type of the constituent metal and the use environment of the vehicle-side terminal 50. Each vehicle-side terminal 50 can be formed, for example, by cutting a metal bar material excellent in conductivity. Further, each vehicle-side terminal 50 can be formed, for example, by press-working a metal plate excellent in conductivity.

Configuration of Terminal Connecting Portion 51

As shown in FIG. 4, the terminal connecting portion 51 is, for example, provided on a front end part of the vehicle-side terminal 50. The terminal connecting portion 51 is, for example, a female terminal. The terminal connecting portion 51 includes a base portion 52 and a tubular connecting portion 53 provided in front of the base portion 52. In the terminal connecting portion 51, the base portion 52 and the tubular connecting portion 53 are integrally formed while being connected in the front-rear direction.

The base portion 52 is, for example, in the form of a column having a solid internal structure. The base portion 52 is, for example, in the form of a solid cylinder shorter in the front-rear direction than the tubular connecting portion 53. As shown in FIG. 3, the base portion 52 is, for example, accommodated in the terminal accommodating portion 34. An outer diameter of the base portion 52 is, for example, set to be slightly smaller than the inner diameter of the terminal accommodating portion 34. With the base portion 52 accommodated in the terminal accommodating portion 34, the outer peripheral surface of the base portion 52 is, for example, at least partially in contact with the inner peripheral surface of the terminal accommodating portion 34. The outer peripheral surface of the base portion 52 and the inner peripheral surface of the terminal accommodating portion 34 may be in surface contact, line contact or point contact with each other.

The tubular connecting portion 53 is, for example, formed into a substantially hollow cylindrical shape. The charger-side terminal 82 of the charger-side connector 80 is inserted into the tubular connecting portion 53. The charger-side terminal 82 of this embodiment is a male terminal. As shown in FIG. 4, the tubular connecting portion 53 includes, for example, a plurality of resilient pieces 53A. The plurality of resilient pieces 53A are, for example, provided at predetermined intervals along a circumferential direction of the base portion 52. In other words, the tubular connecting portion 53 is provided with slits 53X formed by being cut rearward from the front end opening edge of the tubular connecting portion 53 and arranged at predetermined intervals. As shown in FIG. 3, an inner diameter of the tubular connecting portion 53 is set to be slightly smaller than an outer diameter of the charger-side terminal 82. If the charger-side terminal 82 is inserted into the tubular connecting portion 53, the plurality of resilient pieces 53A contact the outer peripheral surface of the charger-side terminal 82. In this way, the tubular connecting portion 53 (terminal connecting portion 51) and the charger-side terminal 82 are electrically connected. An outer diameter of the tubular connecting portion 53 is, for example, set to be smaller than the inner diameter of the terminal accommodating portion 34. The base portion 52 and the tubular connecting portion 53 (i.e. terminal connecting portion 51) described above are accommodated in the terminal accommodating portion 34.

Configuration of Wire Connecting Portion 54

The wire connecting portion 54 is, for example, provided on a rear end part of the vehicle-side terminal 50. The wire connecting portion 54 is electrically connected to an end part of the wire 70. Here, the wire 70 is a coated wire including a core 71 made of a metal material excellent in conductivity and an insulation coating 72 for covering the outer periphery of the core 71. In the end part of the wire 70, the insulation coating 72 is stripped over a predetermined length range from the end of the wire 70 to expose the core 71. The wire connecting portion 54 is connected to an end part of the core 71 exposed from the insulation coating 72. The wire connecting portion 54 is connected to the core 71, for example, by crimping, ultrasonic welding or the like. The wire connecting portion 54 of this embodiment is in the form of an open barrel and connected to the core 71 by crimping. In this way, the wire connecting portion 54 and the core 71 are electrically connected.

Configuration of Locking Portion 55

As shown in FIG. 4, the locking portion 55 is, for example, provided between the terminal connecting portion 51 and the wire connecting portion 54. The locking portion 55 is, for example, provided behind the terminal connecting portion 51 (specifically, base portion 52). The locking portion 55 is, for example, formed to project further radially outwardly of the base portion 52 than the outer peripheral surface of the base portion 52. The locking portion 55 is, for example, formed to project radially outward over the entire periphery in the circumferential direction of the base portion 52. As shown in FIG. 5, the locking portion 55 is, for example, formed into a tubular shape having a hollow internal structure. The locking portion 55 of this embodiment is formed into a hollow cylindrical shape. The locking portion 55 includes, for example, an internal space. As shown in FIG. 3, the locking portion 55 is, for example, held in the terminal holding portion 35. An outer diameter of the locking portion 55 is, for example, set to be larger than the inner diameter of the terminal accommodating portion 34 and slightly smaller than the inner diameter of the terminal holding portion 35. The locking portion 55 is, for example, locked to the rear surface of the back wall portion 31B. With the locking portion 55 held in the terminal holding portion 35, the outer peripheral surface of the locking portion 55 is, for example, at least partially in contact with the inner peripheral surface of the terminal holding portion 35. The outer peripheral surface of the locking portion 55 and the inner peripheral surface of the terminal holding portion 35 may be in surface contact, line contact or point contact with each other.

Configuration of Holding Portion 56

As shown in FIG. 5, the holding portion 56 is, for example, provided between the terminal connecting portion 51 and the wire connecting portion 54. The holding portion 56 is, for example, provided behind the locking portion 55. The holding portion 56 of this embodiment is provided between the locking portion 55 and the wire connecting portion 54. The holding portion 56 is, for example, formed into a hollow cylindrical shape. An internal space of the holding portion 56 communicates, for example, with that of the locking portion 55. An inner diameter of the holding portion 56 is, for example, equal to that of the locking portion 55. For example, the inner peripheral surface of the holding portion 56 is formed to be continuous and integral with the inner peripheral surface of the locking portion 55 without any step. An accommodation space 57 for accommodating the heat storage body 60 is constituted by these internal spaces of the holding portion 56 and the locking portion 55. A bottom part of the accommodation space 57 is, for example, constituted by the rear surface of the base portion 52. An outer diameter of the holding portion 56 is, for example, set to be smaller than that of the locking portion 55. The outer diameter of the holding portion 56 is, for example, set about equal to that of the base portion 52. As shown in FIGS. 4 and 5, the holding portion 56 and the terminal connecting portion 51 of the vehicle-side terminal 50 may be arranged in a row, e.g. coaxially or linearly. The terminal connecting portion 51, the holding portion 56 and the wire connecting portion 54 of the vehicle-side terminal 50 may be arranged in a row, e.g. coaxially or linearly.

Configuration of Heat Storage Body 60

The heat storage body 60 is held in the holding portion 56 of the vehicle-side terminal 50. That is, the heat storage body 60 is provided between the terminal connecting portion 51 and the wire connecting portion 54. The heat storage body 60 of this embodiment is accommodated in the accommodation space 57 formed in the locking portion 55 and the holding portion 56 of the vehicle-side terminal 50. The heat storage body 60 includes a case 61 and a heat storage material 65 accommodated in the case 61.

Configuration of Case 61

The case 61 includes a case body 62 in the form of a bottomed tube formed to contact the inner peripheral surface of the accommodation space 57, and a cover 63 for closing an opening of the case body 62. A thermally expandable material or thermally conductive material can be used as materials of the case body 62 and the cover 63. A rubber, a resin, a metal or the like can be, for example, used as the thermally expandable material. By constituting the case 61 of the thermally expandable material, the outer peripheral surface of the case 61 can be held in close contact with the inner peripheral surface of the accommodation space 57, regardless of a temperature change. EPDM (ethylene propylene diene rubber), silicon rubber, fluororubber or the like can be, for example, used as the rubber. An epoxy-based resin, a polyethylene-based resin, a polyurethane-based resin or the like can be, for example, used as the resin. A copper-based or aluminum-based metal material can be used as the metal. The case body 62 and the cover 63 may be made of the same material or may be made of different materials.

The outer peripheral surface of the case body 62 is, for example, shaped to correspond to the inner peripheral surface of the accommodation space 57. The case body 62 of this embodiment is in the form of a bottomed hollow cylinder. An outer diameter of the case body 62 is, for example, set to be slightly smaller than an inner diameter of the accommodation space 57. The case body 62 includes an accommodating portion 64 for accommodating the heat storage material 65.

The cover 63 is fixed to the case body 62 to close an opening of the case body 62. The cover 63 is secured to the case body 62, for example, by a method such as ultrasonic welding or laser welding. The cover 63 of this embodiment is in the form of a circular plate.

If the opening of the case body 62 is closed by the cover 63 with the heat storage material 65 accommodated in the accommodating portion 64 of the case body 62, the heat storage material 65 is confined inside the case 61.

Configuration of Heat Storage Member 65

The heat storage material 65 can temporarily store heat. A material utilizing latent heat during a phase change between a liquid and a solid can be used as the heat storage material 65. Further, a material having a melting point in a used temperature range can be used as the heat storage material 65. For example, paraffine, sodium sulfate tetrahydrate, sodium acetate trihydrate, vanadium dioxide or the like can be used as the material of the heat storage material 65.

Holding Mode of Heat Storage Body 60

The case 61 having the heat storage material 65 accommodated inside, i.e. the heat storage body 60, is inserted into the accommodation space 57 of the vehicle-side terminal 50. That is, the heat storage body 60 of this embodiment is provided inside the vehicle-side terminal 50. In other words, the heat storage body 60 of this embodiment is held in the vehicle-side terminal 50 without covering the outer surface of the vehicle-side terminal 50. For example, the heat storage body 60 is inserted into the accommodation space 57 along the front-rear direction.

With the heat storage body 60 accommodated in the accommodation space 57, the bottom wall of the case body 62 is at least partially in contact with a bottom part of the accommodation space 57 (i.e. rear surface of the base portion 52). With the heat storage body 60 accommodated in the accommodation space 57, the outer peripheral surface of the case body 62 is at least partially in contact with the inner peripheral surface of the accommodation space 57. The outer surface of the case body 62 and the inner surface of the accommodation space 57 may be in surface contact, line contact or point contact with each other. The heat storage material 65 accommodated inside the case 61 stores heat generated from the vehicle-side terminal 50.

The case 61 is closed by the cover 63. The leakage of the heat storage material 65 liquefied inside the case 61 can be suppressed by this cover 63. For example, the cover 63 is so fixed to the case body 62 that the liquefied heat storage material 65 cannot flow out.

Note that an adhesive, thermal interface material (TIM) or the like may be interposed between the inner surface of the accommodation space 57 and the outer surface of the case 61. An epoxy resin-based, polyurethane-based or acrylic resin-based adhesive can be, for example, used as the adhesive. A soft metal such as indium or silver, silicone gel or an organic resin binder containing a metal filler can be, for example, used as the thermal interface material.

The connection terminal is composed of the vehicle-side terminal 50 and the heat storage body 60 described above.

Configuration of Retainer 40

As shown in FIG. 3, the retainer 40 is mounted on the rear end of the tube portion 33 of the housing body 30. The retainer 40 retains the vehicle-side terminals 50. The retainer 40 is, for example, made of synthetic resin. A synthetic resin such as polyolefin, polyamide, polyester or ABS resin can be, for example, as a material of the retainer 40.

The retainer 40 includes a base portion 41, a peripheral wall 42, terminal pressing portions 43, wire holding portions 44 and a surrounding wall portion 45. The base portion 41 is, for example, in the form of a circular plate. The peripheral wall 42 is, for example, formed to project forward from a peripheral edge part of the base portion 41. The peripheral wall 42 is, for example, formed over the entire periphery in a circumferential direction of the peripheral edge part of the base portion 41. The peripheral wall 42 is, for example, disposed outside the tube portion 33 of the housing body 30. That is, the peripheral wall 42 is externally fit to the tube portion 33 of the housing body 30. For example, engaging portions (not shown) to be engaged with each other are respectively formed on the outer peripheral surfaces of the peripheral wall 42 and the tube portion 33. The retainer 40 is mounted on the rear end of the tube portion 33, for example, by engaging the engaging portions of the peripheral wall 42 and the tube portion 33.

The terminal pressing portion 43 is, for example, formed to project forward from the base portion 41. The terminal pressing portion 43 is provided at a position corresponding to the terminal holding portion 35 of the housing body 30. The terminal pressing portion 43 is, for example, formed into a tubular shape. The terminal pressing portion 43 of this embodiment is formed into a hollow cylindrical shape. The terminal pressing portion 43 is inserted between the inner surface of the terminal holding portion 35 and the outer surface of the vehicle-side terminal 50. A tip part (here, a front end part) of the terminal pressing portion 43 comes into contact with the rear surface of the locking portion 55 of the vehicle-side terminal 50. The vehicle-side terminal 50 can be prevented from coming out rearward by this retainer 40.

The wire holding portion 44 is formed to project rearward from the base portion 41. The wire holding portion 44 is provided at a position corresponding to the terminal pressing portion 43. The wire holding portion 44 is, for example, provided on the same axis as the terminal pressing portion 43. The wire holding portion 44 of this embodiment is formed into a hollow cylindrical shape. An outer diameter of the wire holding portion 44 is, for example, set equal to that of the terminal pressing portion 43. An inner diameter of the wire holding portion 44 is, for example, set equal to that of the terminal pressing portion 43. An internal space of the wire holding portion 44 and that of the terminal pressing portion 43 communicate with each other. The wire 70 is accommodated in the internal space of the wire holding portion 44.

The surrounding wall portion 45 projects rearward from the base portion 41. The surrounding wall portion 45 is, for example, formed to collectively surround a plurality of the wire holding portions 44. The surrounding wall portion 45 of this embodiment is formed into a hollow cylindrical shape.

Functions

Next, functions of the vehicle-side connector 10 are described.

If the charger-side connector 80 shown in FIG. 1 is connected to the vehicle-side connector 10, a charging current is supplied from a charger outside the vehicle to the power storage device installed in the vehicle V through the charger-side connector 80 and the vehicle-side connector 10. At this time, a large charging current is supplied from the charger outside the vehicle to the power storage device to shorten a charging time. At the start of supply of this charging current, heat is generated in contact parts of the charger-side terminals 82 and the vehicle-side terminals 50 (terminal connecting portions 51), the vehicle-side terminals 50, contact parts of the wires 70 and the vehicle-side terminals 50 (wire connecting portions 54) and the like. Particularly, heat is easily generated in the contact parts of the charger-side terminals 82 and the vehicle-side terminals 50 and the contact parts of the wires 70 and the vehicle-side terminals 50 (wire connecting portions 54). The heat in the vehicle-side terminals 50 and the like suddenly increases at the start of the charging, and transitions at temperatures lower than a maximum temperature at the start of the charging.

At this time, in the vehicle-side connector 10 of this embodiment, the heat storage body 60 including the heat storage material 65 is accommodated in the vehicle-side terminal 50. Specifically, the heat storage body 60 is held in the holding portion 56 between the terminal connecting portion 51 and the wire connecting portion 54 of the vehicle-side terminal 50. The heat storage material 65 is for temporarily storing heat. The heat storage material 65 temporarily stores latent heat (heat of dissolution) by a phase change from a solid to a liquid caused by heat generated in the vehicle-side terminal 50 and the like. That is, the heat storage material 65 absorbs the heat generated in the vehicle-side terminal 50. In this way, a sudden temperature increase of the vehicle-side terminal 50 can be suppressed. Further, by the absorption of heat by the heat storage material 65, the amount of heat transferred from the vehicle-side terminal 50 to the wire 70, the connector housing 20 and the like can be reduced. Thus, sudden temperature increases of the wire 70, the connector housing 20 and the like can also be suppressed. By using the heat storage material 65, maximum temperatures of the vehicle-side terminal 50 and the connector housing 20 at the start of the charging can be reduced to temperatures lower than maximum temperatures when the heat storage material 65 is not used.

When a predetermined time elapses from the start of the charging, the temperature of the vehicle-side terminal 50 transitions at the predetermined temperatures lower than the maximum temperature. Here, for example, a thickness of the vehicle-side terminal 50, a thickness of the wire 70 and the like are so set that the vehicle-side terminal 50 and the wire 70 can withstand highest maximum temperatures rising even temporarily. In this embodiment, temperature increases of the vehicle-side terminal 50 and the wire 70 can be suppressed by using the heat storage body 60. Thus, cross-sectional areas of the vehicle-side terminal 50 and the wire 70 can be set small. In this way, the vehicle-side terminal 50 can be formed to be thin and the wire 70 can be formed to be thin. Therefore, the vehicle-side terminal 50 and the wire 70 can be reduced in weight.

Here, the heat storage body 60 is held in a part of the vehicle-side terminal 50. That is, the heat storage body 60 is directly in contact with the vehicle-side terminal 50. Thus, heat generated in the vehicle-side terminal 50 is more easily absorbed by the heat storage material 65 of the heat storage body 60. Therefore, temperature increases of the vehicle-side terminal 50 and the wire 70 can be effectively suppressed. Further, the heat storage body 60 is provided between the terminal connecting portion 51 and the wire connecting portion 54. Thus, the heat storage body 60 is provided near both the terminal connecting portion 51 and the wire connecting portion 54. In this way, the heat storage body 60 can be provided in a part where heat is easily generated at the start of the charging, i.e. in the contact part of the terminal connecting portion 51 and the charger-side terminal 82 and the contact part of the wire connecting portion 54 and the wire 70. Therefore, heat generated in the part where heat is easily generated can be efficiently absorbed by the heat storage material 65 of the heat storage body 60. As a result, temperature increases of the vehicle-side terminal 50 and the wire 70 can be effectively suppressed.

When the charging of the power storage device installed in the vehicle V is finished, the charger-side connector 80 is detached from the vehicle-side connector 10. Then, the heat stored in the heat storage materials 65 of the vehicle-side connector 10 is gradually dissipated through the vehicle-side terminals 50 and the connector housing 20. By this heat dissipation, the heat storage materials 65 are solidified. Unless the charging is performed, no current flows in the vehicle-side terminals 50. Thus, the vehicle-side terminals 50 do not generate heat. The heat storage materials 65 in this case are solidified by dissipating heat.

Next, effects of this embodiment are described.

(1) The vehicle-side connector 10 includes the vehicle-side terminals 50 made of metal and the heat storage bodies 60 held in the vehicle-side terminals 50. The vehicle-side terminal 50 includes the terminal connecting portion 51 to be electrically connected to the charger-side terminal 82, the wire connecting portion 54 to be electrically connected to the wire 70 and the holding portion 56 integrally formed to the terminal connecting portion 51 and the wire connecting portion 54. The heat storage body 60 is held in the holding portion 56.

In this configuration, the vehicle-side terminal 50 generates heat by a current flowing during use. At this time, the heat generated in the vehicle-side terminal 50 can be absorbed by the heat storage body 60 held in the holding portion 56 of the vehicle-side terminal 50. In this way, a sudden temperature increase of the vehicle-side terminal 50 can be suppressed. Thus, the cross-sectional area of the vehicle-side terminal 50 can be set small. In this way, the vehicle-side terminal 50 can be formed to be thin. Therefore, the vehicle-side terminal 50 can be reduced in weight.

(2) The holding portion 56 is provided between the terminal connecting portion 51 and the wire connecting portion 54. According to this configuration, the heat storage body 60 held in the holding portion 56 is provided between the terminal connecting portion 51 and the wire connecting portion 54. Thus, the heat storage body 60 can be provided near both the terminal connecting portion 51 and the wire connecting portion 54. Here, in the terminal, heat is easily generated in the terminal connecting portion 51 connected to the charger-side terminal 82 and the wire connecting portion 54 connected to the wire 70. Since the heat storage body 60 can be provided near both the terminal connecting portion 51 and the wire connecting portion 54, heat generated in the terminal connecting portion 51 and the wire connecting portion 54 can be efficiently absorbed by the heat storage body 60. In this way, a sudden temperature increase of the vehicle-side terminal 50 can be suppressed.

(3) The heat storage body 60 is held inside the holding portion 56. According to this configuration, the heat storage body 60 is arranged inside the holding portion 56. In this way, the heat storage body 60 can be held in the holding portion 56 without covering the outer surface of the holding portion 56. Thus, even if the heat storage body 60 is provided, it can be suppressed that heat dissipation from the outer surface of the holding portion 56 is blocked by the heat storage body 60. For example, the outer surface of the holding portion can be brought into contact with the connector housing when the vehicle-side terminal 50 is held in the connector housing. Thus, the heat generated in the terminal can be transferred to the connector housing through the outer surface of the holding portion of the terminal. In this way, the heat generated in the terminal can be efficiently released to the atmosphere from the outer surface of the connector housing. Therefore, the heat generated in the terminal can be efficiently dissipated.

(4) The heat storage body 60 includes the case 61 held in the holding portion 56 and the heat storage material 65 accommodated inside the case 61. According to this configuration, the heat generated in the vehicle-side terminal 50 can be absorbed by the heat storage material 65 accommodated inside the case 61. In this way, a sudden temperature increase of the vehicle-side terminal 50 can be suppressed. Further, since the heat storage material 65 can be accommodated in the case 61 separate from the vehicle-side terminal 50, the heat storage body 60 can be handled separately from the vehicle-side terminal 50. In this way, the handleability of the heat storage body 60 can be improved.

(5) The case 61 is made of the thermally expandable material. According to this configuration, the case 61 made of the thermally expandable material expands, for example, due to heat transferred from the vehicle-side terminal 50. In this way, the case 61 can be suitably held in close contact with the holding portion 56. In this embodiment, the outer surface of the case 61 can be suitably held in close contact with the inner surface of the accommodation space 57 of the vehicle-side terminal 50. As a result, heat transferability between the vehicle-side terminal 50 and the heat storage body 60 can be enhanced. Thus, the heat generated in the vehicle-side terminal 50 can be efficiently absorbed by the heat storage material 65 of the heat storage body 60 and a temperature increase of the vehicle-side terminal 50 can be more effectively suppressed.

(6) The holding portion 56 is formed into a tubular shape and the heat storage body 60 is provided in the internal space of the holding portion 56. According to this configuration, the heat storage body 60 can be held in the holding portion 56 by inserting the heat storage body 60 into the internal space of the tubular holding portion 56.

(7) The vehicle-side connector 10 includes the vehicle-side terminals 50, the heat storage bodies 60 held in the vehicle-side terminals 50 and the connector housing 20 for holding the vehicle-side terminals 50. According to this configuration, the amount of heat transferred from the vehicle-side terminals 50 to the connector housing 20 can be reduced by absorbing the heat generated in the vehicle-side terminals 50 by the heat storage bodies 60. Thus, a sudden temperature increase of the connector housing 20 can be suppressed.

Other Embodiments

The above embodiment can be modified and carried out as follows. The above embodiment and the following modifications can be carried out in combination without technically contradicting each other.

The structure of the holding portion 56 in the above embodiment is not particularly limited. That is, the structure of the holding portion 56 is not particularly limited as long as the heat storage body 60 can be held.

Figure 6:
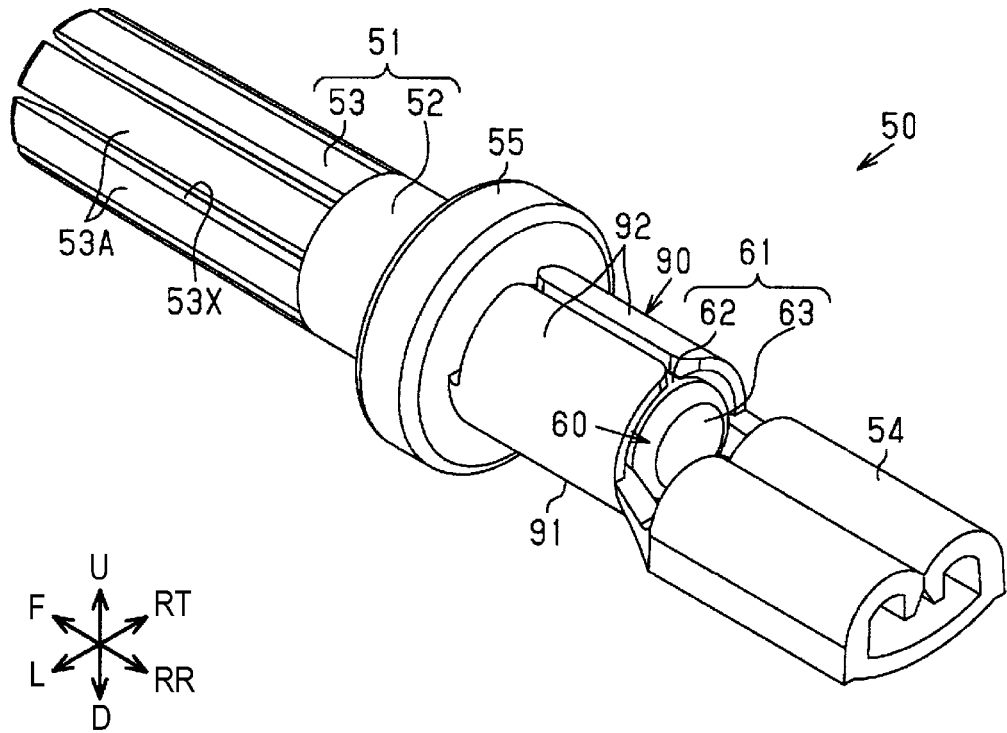
FIG. 6 is a schematic perspective view showing a vehicle-side terminal of a modification.
Figure 7:
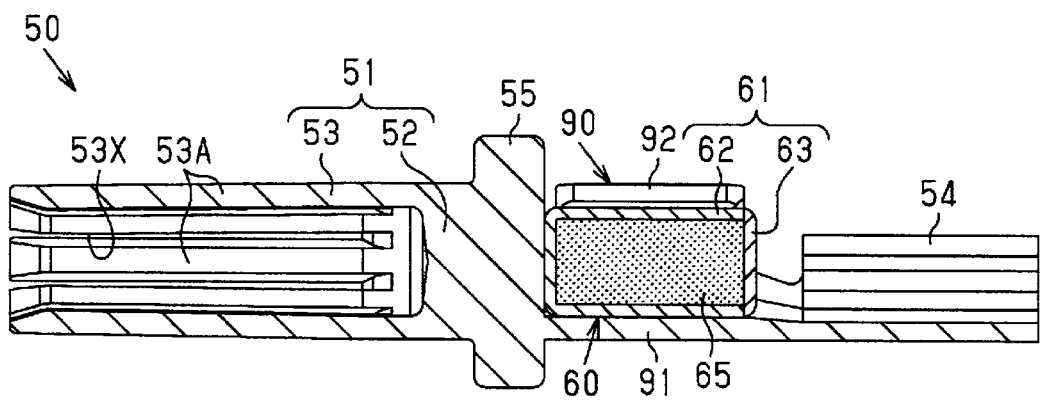
FIG. 7 is a schematic section showing the vehicle-side terminal of the modification.

For example, as shown in FIGS. 6 and 7, a holding portion 90 may be adopted instead of the holding portion 56. The holding portion 90 includes, for example, a bottom wall 91 extending between the locking portion 55 and the wire connecting portion 54 and a pair of projecting pieces 92 projecting upward from both end parts in the lateral direction of the bottom wall 91. The bottom wall 91 is, for example, formed to expand in the front-rear direction and lateral direction. The respective projecting pieces 92 are formed to project in a direction (here, upward) intersecting an arrangement direction (here, front-rear direction) of the terminal connecting portion 51, the holding portion 90 and the wire connecting portion 54. The holding portion 90 in this case holds the heat storage body 60 by crimping the projecting pieces 92 to the outer surface of the heat storage body 60. In this way, the projecting pieces 92 can be suitably held in close contact with the outer surface of the heat storage body 60. The projecting pieces 92 are shaped in conformity with the outer peripheral surface of the case body 62. The projecting pieces 92 are formed to cover the outer peripheral surface of the case body 62.

In this modification, the locking portion 55 is in the form of a column having a solid internal structure. The locking portion 55 of this modification is in the form of a solid cylinder. At this time, the bottom wall of the case body 62 of the heat storage body 60 is at least partially in contact with the rear surface of the locking portion 55 as shown in FIG. 7. The outer surface of the case body 62 and the rear surface of the locking portion 55 may be in surface contact, line contact or point contact with each other.

The heat storage body 60 of this modification is placed on the bottom wall 91 of the holding portion 90 in a state where the pair of projecting pieces 92 are projecting upward, i.e. on the bottom wall 91 exposed from the pair of projecting pieces 92. Subsequently, the pair of projecting pieces 92 are crimped along the outer surface of the heat storage body 60. In this way, the heat storage body 60 can be held in the holding portion 90 with the projecting pieces 92 held in close contact with the outer surface of the heat storage body 60. As a result, heat transferability between the vehicle-side terminal 50 and the heat storage body 60 can be enhanced. Thus, heat generated in the vehicle-side terminal 50 can be efficiently absorbed by the heat storage body 60 and a temperature increase of the vehicle-side terminal 50 can be effectively suppressed.

Figure 8:
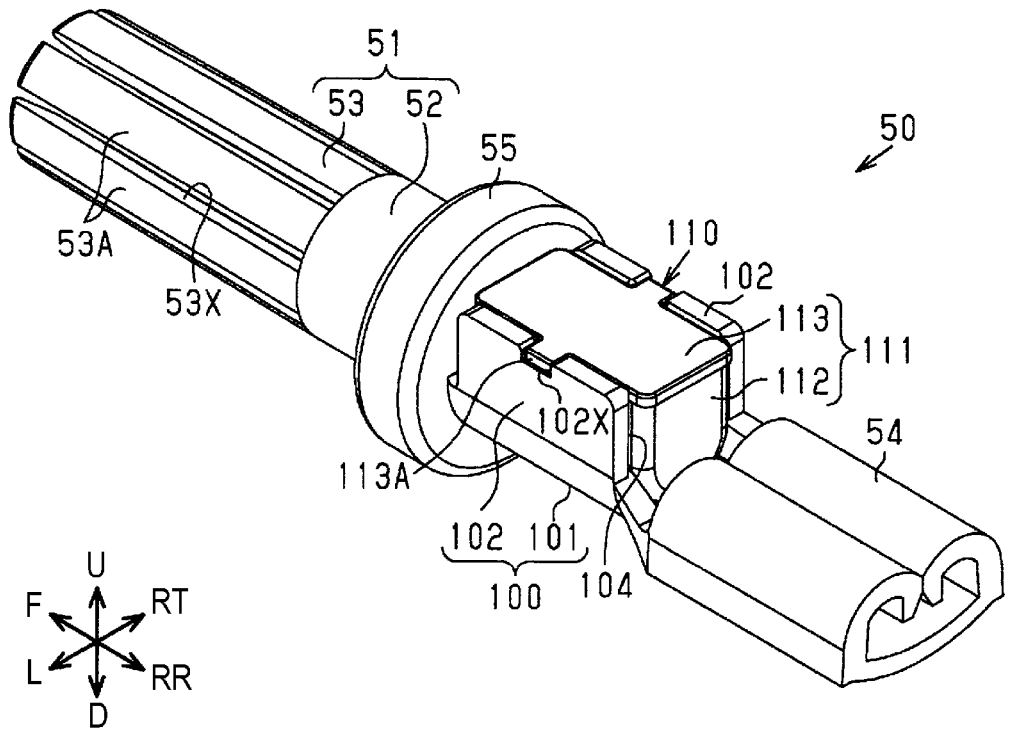
FIG. 8 is a schematic perspective view showing a vehicle-side terminal of a modification.
Figure 9:
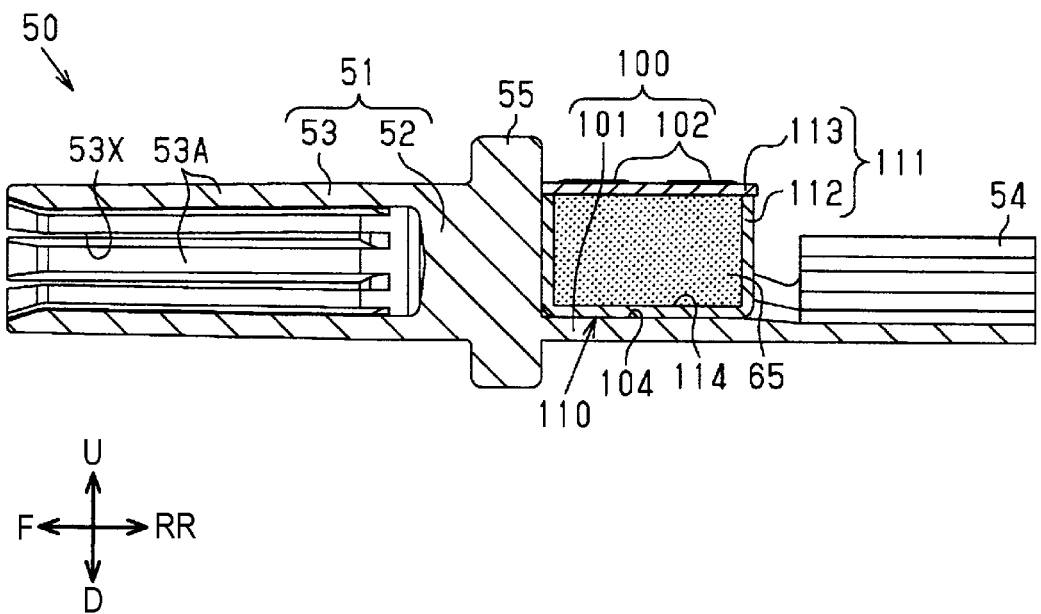
FIG. 9 is a schematic section showing the vehicle-side terminal of the modification.

For example, as shown in FIGS. 8 and 9, a holding portion 100 may be adopted instead of the holding portion 56. The holding portion 100 includes, for example, a bottom wall 101 extending between the locking portion 55 and the wire connecting portion 54 and a pair of side walls 102 rising on both end parts in the lateral direction of the bottom wall 101. The bottom wall 101 is, for example, formed to expand in the front-rear direction and lateral direction.

As shown in FIG. 8, the respective side walls 102 are formed to project in a direction (here, upward) intersecting an arrangement direction (here, front-rear direction) of the terminal connecting portion 51, the holding portion 100 and the wire connecting portion 54. The respective side walls 102 are, for example, formed to rise perpendicularly from the upper surfaces of the both end parts in the lateral direction of the bottom wall 101. Recesses 102X recessed toward the bottom wall 101 are formed in the upper end surfaces of the respective side walls 102. Note that "perpendicular" in this specification means not only strictly perpendicular, but also substantially perpendicular within a range where functions and effects in this modification are achieved.

A groove-like accommodation space 104 is formed by the bottom wall 101 and the pair of side walls 102. The accommodation space 104 is, for example, formed into a rectangular tube shape. The accommodation space 104 is, for example, formed to be open upward. The accommodation space 104 is, for example, formed to penetrate in the front-rear direction. Here, the locking portion 55 of this modification is in the form of a solid cylinder. Thus, as shown in FIG. 9, a part of the rear surface of the locking portion 55 is exposed from the accommodation space 104.

A heat storage body 110 is held in the holding portion 100. That is, the heat storage body 110 is provided between the terminal connecting portion 51 and the wire connecting portion 54. The heat storage body 110 of this modification is accommodated in the accommodation space 104 of the vehicle-side terminal 50. The heat storage body 110 includes a case 111 and the heat storage material 65 accommodated in the case 111.

The case 111 includes s a case body 112 in the form of a bottomed tube formed to contact the inner surface of the accommodation space 104, and a cover 113 for closing an opening of the case body 112. Similarly to the case body 62 and the cover 63 (see FIG. 5), a thermally expandable material or thermally conductive material can be used as materials of the case body 112 and the cover 113. The case body 112 and the cover 113 may be made of the same material or may be made of different materials.

The outer surface of the case body 112 is, for example, shaped to correspond to the inner surface of the accommodation space 104. The case body 112 of this embodiment is in the form of a bottomed rectangular tube. External dimensions of the case body 112 are, for example, set to be fittable into the accommodation space 104. The case body 112 includes an accommodating portion 114 for accommodating the heat storage material 65.

As shown in FIG. 8, the cover 113 is fixed to the case body 112 to close an opening of the case body 112. The cover 113 is secured to the case body 112, for example, by a method such as ultrasonic welding or laser welding. The cover 113 is, for example, in the form of a substantially rectangular plate. The cover 113 includes a pair of engaging portions 113A to be engaged with the side walls 102 of the holding portion 100. The respective engaging portions 113A are, for example, formed to project in the lateral direction. The respective engaging portions 113A are, for example, formed at positions corresponding to the recesses 102X of the side walls 102. For example, the engaging portion 113A is formed to engage an engaging portion (not shown) formed in the recess 102X of the side wall 102.

As shown in FIG. 9, if the opening of the case body 112 is closed by the cover 113 with the heat storage material 65 accommodated in the accommodating portion 114 of the case body 112, the heat storage material 65 is confined inside the case 111. For example, the cover 113 is so fixed to the case body 112 that the liquefied heat storage material 65 cannot flow out.

The heat storage body 110 of this modification is, for example, inserted into the accommodation space 104 of the holding portion 100 from above along the vertical direction. The heat storage body 110 at this time is, for example, such that the cover 113 is fixed to the case body 112 and the heat storage material 65 is confined inside the case 111. Then, as shown in FIG. 8, the engaging portions 113A of the cover 113 are engaged with the engaging portions (not shown) formed in the recesses 102X of the side walls 102, whereby the heat storage body 110 is held in the holding portion 100. In this way, the heat storage body 110 can be easily held in the holding portion 100.

With the heat storage body 110 held in the holding portion 100, the upper surface of the cover 113 is, for example, exposed from the holding portion 100. With the heat storage body 110 held in the holding portion 100, the bottom wall of the case body 112 is, for example, at least partially in contact with the inner surface of the accommodation space 104, specifically the upper surface of the bottom wall 101. With the heat storage body 110 held in the holding portion 100, the side walls of the case body 112 are, for example, at least partially in contact with the inner surface of the accommodation space 104, specifically the inner side surfaces of the side walls 102. The outer surface of the case body 112 and the inner surface of the accommodation space 104 may be in surface contact, line contact or point contact with each other.

Although the engaging portions 113A to be engaged with the side walls 102 of the holding portion 100 are provided on the cover 113 in the modification shown in FIG. 8, the formation positions of the engaging portions 113A are not particularly limited. For example, the engaging portions 113A may be provided on the case body 112.

Although the terminal connecting portion 51 is embodied as a female terminal including the tubular connecting portion 53 in the above embodiment, there is no limitation to this.

Figure 10:
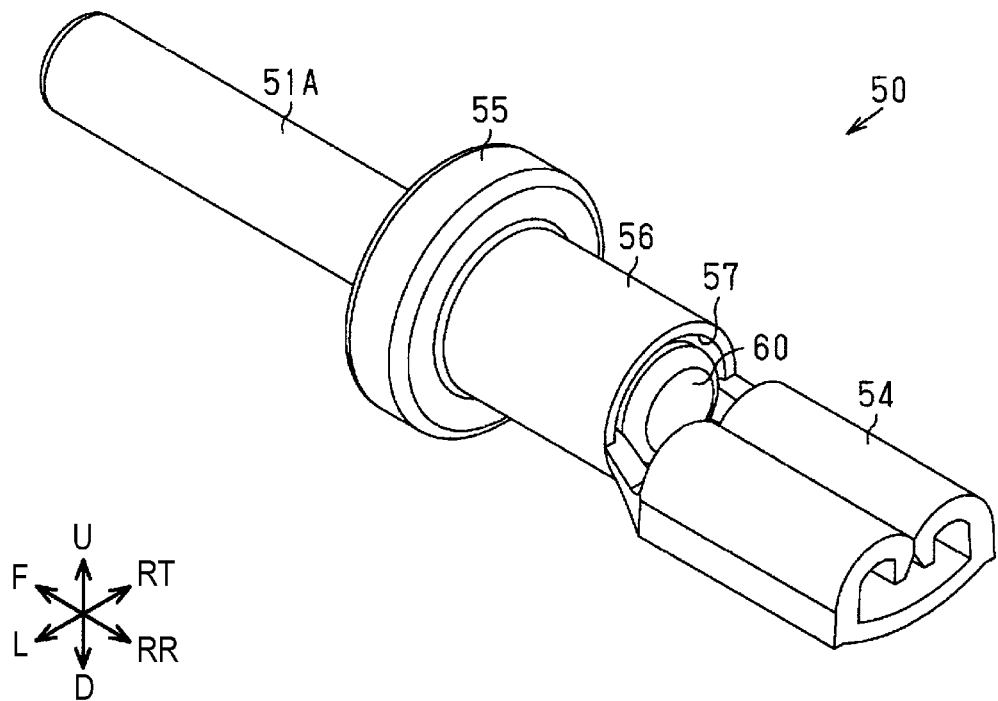
FIG. 10 is a schematic perspective view showing a vehicle-side terminal of a modification.
Figure 11:
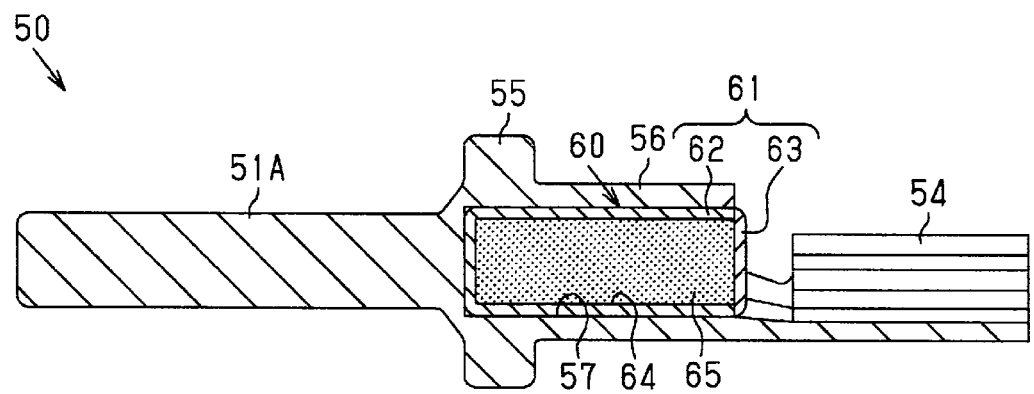
FIG. 11 is schematic section showing the vehicle-side terminal of the modification.

For example, as shown in FIGS. 10 and 11, a terminal connecting portion 51A may be adopted instead of the terminal connecting portion 51. The terminal connecting portion 51A is a male terminal. The terminal connecting portion 51 is, for example, in the form of a column having a solid internal structure. The terminal connecting portion 51A of this modification is in the form of a solid cylinder. In this case, the charger-side terminal 82 (see FIG. 3) is, for example, a female terminal.

Figure 12:
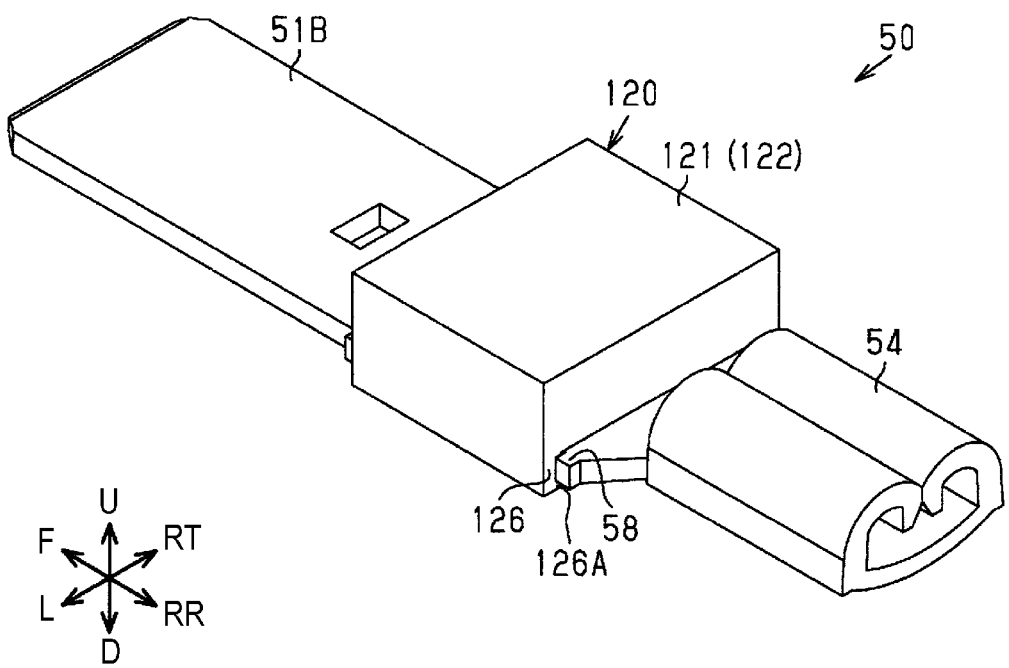
FIG. 12 is a schematic perspective view showing a vehicle-side terminal of a modification.
Figure 13:
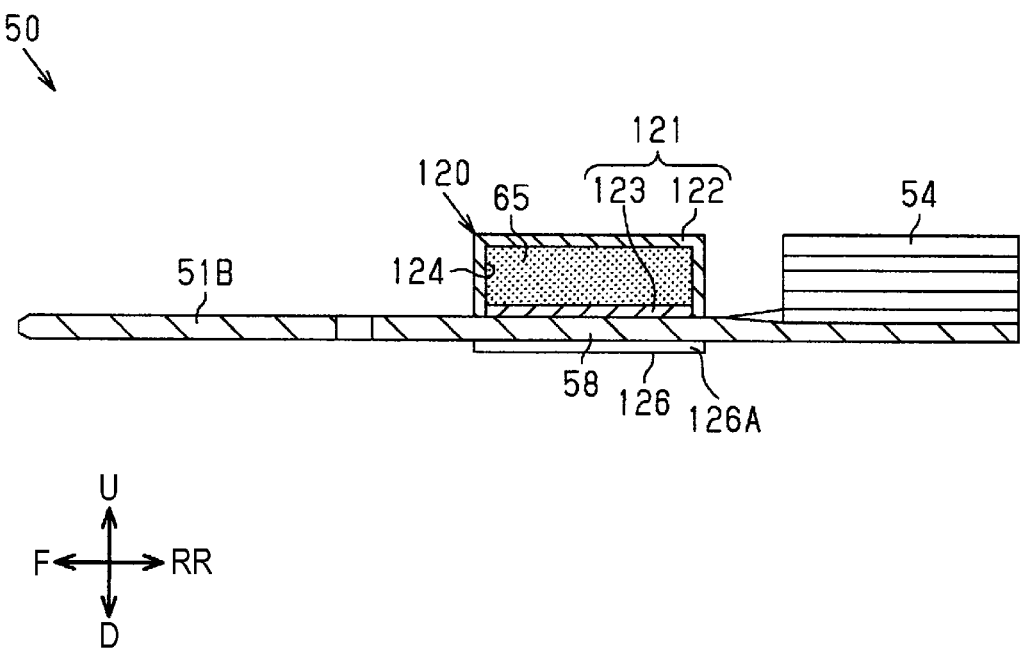
FIG. 13 is a schematic section showing the vehicle-side terminal of the modification.

For example, as shown in FIGS. 12 and 13, a terminal connecting portion 51B may be adopted instead of the terminal connecting portion 51. The terminal connecting portion 51B is, for example, in the form of a flat plate. The charger-side terminal 82 (see FIG. 3) in this case may be a female terminal or flat plate-like terminal.

Although the heat storage body 60 is held inside the holding portion 56 in the above embodiment, there is no limitation to this. For example, the heat storage body 60 may be held outside the holding portion 56. For example, the heat storage body 60 may be held on the holding portion 56 to cover the outer surface of the holding portion 56.

For example, as shown in FIGS. 12 and 13, a heat storage body 120 may be held outside a holding portion 58 provided between the terminal connecting portion 51B and the wire connecting portion 54. The heat storage body 120 is held on the holding portion 58 to partially cover the outer surface of the holding portion 58.

As shown in FIG. 13, the heat storage body 120 includes a case 121 and the heat storage material 65 accommodated in the case 121. The case 121 includes a case body 122 in the form of a bottomed tube and a cover 123 for closing an opening of the case body 122. Similarly to the case body 62 and the cover 63 (see FIG. 5), a thermally expandable material or thermally conductive material can be used as materials of the case body 122 and the cover 123. The case body 122 and the cover 123 may be made of the same material or may be made of different materials.

The case body 122 of this embodiment is in the form of a bottomed rectangular tube. The case body 122 is dimensioned to be fittable to the holding portion 58 from outside. The case body 122 includes an accommodating portion 124 for accommodating the heat storage material 65. The cover 123 is fixed to the case body 122 to close an opening of the case body 122. The cover 123 is secured to the case body 122, for example, by a method such as ultrasonic welding or laser welding. The cover 123 is, for example, in the form of a substantially rectangular plate. With the heat storage body 120 held on the holding portion 58, the lower surface of the cover 123 is, for example, in contact with the upper surface of the holding portion 58. The lower surface of the cover 123 and the upper surface of the holding portion 58 may be in surface contact, line contact or point contact with each other.

If the opening of the case body 122 is closed by the cover 123 with the heat storage material 65 accommodated in the accommodating portion 124 of the case body 122, the heat storage material 65 is confined inside the case 121. For example, the cover 123 is so fixed to the case body 122 that the liquefied heat storage material 65 cannot flow out.

As shown in FIG. 12, the case body 122 includes a pair of engaging portions 126 to be engaged with the holding portion 58. The respective engaging portions 126 are, for example, formed to project downward from side walls of the case body 122 located on both end parts in the lateral direction. For example, the respective engaging portions 126 are formed to project further downward than the accommodating portion 124 (see FIG. 13). An engaging claw 126A to be engaged with the lower surface of the holding portion 58 is formed on a lower end part of the engaging portion 126. The engaging claw 126A is formed to project toward a laterally central part of the holding portion 58. The heat storage body 120 is held on the holding portion 58 by the engagement of the engaging claws 126A with the lower surface of the holding portion 58. At this time, the holding portion 58 is sandwiched by the cover 123 (see FIG. 13) and the engaging portions 126 (engaging claws 126A).

Although the holding portion 56 is provided between the locking portion 55 and the wire connecting portion 54 in the above embodiment, there is no limitation to this. For example, the holding portion 56 may be provided between the locking portion 55 and the terminal connecting portion 51.

Although the holding portion 56 and the heat storage body 60 held in the holding portion 56 are provided between the locking portion 55 and the wire connecting portion 54 in the above embodiment, there is no limitation to this. That is, the formation position of the holding portion 56 is not particularly limited as long as the vehicle-side terminal 50 is structured to hold the heat storage body 60 in the holding portion 56, which is a part of the vehicle-side terminal 50. For example, the holding portion 56 may be provided at a position vertically overlapping the wire connecting portion 54.

The retainer 40 in the above embodiment may be omitted.

The connection method of the wire connecting portion 54 and the wire 70 in the above embodiment is not limited to crimping. For example, the wire connecting portion 54 and the wire 70 may be connected by laser welding, ultrasonic welding or bolting.

The structure of the wire 70 in the above embodiment is not particularly limited. For example, the wire 70 may be embodied by a busbar.

Although the heat storage body 60 is installed in the vehicle-side terminal 50 provided in the vehicle-side connector 10 for charging the power storage device installed in the vehicle V in the above embodiment, there is no limitation to this. For example, the heat storage body 60 may be installed in a connection terminal provided in a connector installed in the vehicle V other than the vehicle-side connector 10.

The charger-side connector 80 of the embodiment is an example of a power supply connector including a power supply terminal. The vehicle-side connector 10 of the embodiment is an example of a power receiving connector including a power receiving terminal. The connection terminal of the embodiment is an example of a vehicle charging terminal and may be, for example, a vehicle power receiving terminal. The vehicle-side terminal 50 of the embodiment is an example of a terminal fitting. The case 61, 111, 121 of the heat storage body 60, 110, 120 of the embodiment is an example of a heat storage material container prepared independently of the terminal fitting and heat-transferably coupled to the terminal fitting. The accommodating portion 64, 114, 124 of the embodiment is an example of a heat storage material chamber sealable so that the heat storage material 65 does not leak. The holding portion 56 of the embodiment is an example of a heat storage material container mount to which the heat storage material container is fixedly mounted.

The present disclosure includes the following implementation examples. Reference signs of several constituent elements of illustrative embodiments are given not for limitation, but for understanding assistance. Matters described in the following implementation examples may be partly omitted or several of the matters described in the implementation examples may be selected or extracted and combined.

[Addendum 1] The present disclosure includes a manufacturing method for vehicle charging terminal. In several implementation examples, the manufacturing method for vehicle charging terminal may include a step of preparing a terminal fitting (50), a step of preparing a heat storage body (60; 110; 120) and a step of fixing the heat storage body (60; 110; 120) to the terminal fitting (50).

[Addendum 2] In several implementation examples, the step of preparing the terminal fitting (50) may include a step of integrally forming a terminal connecting portion (51; 51A; 51B) configured to be connected to a power supply terminal, a wire connecting portion (54) configured to be connected to a wire and a container mount (56) provided between the terminal connecting portion (51; 51A; 51B) and the wire connecting portion (54). The integrally forming step may include a step of press-working a metal plate.

[Addendum 3] In several implementation examples, the step of preparing the heat storage body (60; 110; 120) may include a step of preparing a heat storage material (65), a step of preparing a heat storage material container (61; 111; 121) and a step of accommodating the heat storage material (65) into the heat storage material container (61; 111; 121).

[Addendum 4] In several implementation examples, the step of preparing the heat storage material (65) may include a step of preparing the heat storage material (65) as a solid having a predetermined shape, such in the form of powder, particles, flakes or a block. The heat storage material (65) may be configured to be liquefied, fluidized or softened in the heat storage material container (61; 111; 121) by receiving heat of the terminal fitting transferred via the heat storage material container (61; 111; 121).

[Addendum 5] In several implementation examples, the step of preparing the heat storage material container (61; 11; 121) may include a step of preparing the heat storage material container (61; 111; 121) configured to thermally couple the terminal fitting (50) and the heat storage material (65) and promote heat transfer from the terminal fitting to the heat storage material (65).

[Addendum 6] In several implementation examples, the step of accommodating the heat storage material (65) into the heat storage material container (61; 111; 121) may include a step of sealing the heat storage material container (61; 111; 121).

[Addendum 7] In several implementation examples, the step of fixing the heat storage body (60; 110; 120) to the terminal fitting (50) may include a step of fixedly mounting the heat storage material container (61; 111; 121) to the container mount (56) of the terminal fitting (50) after the terminal fitting (50) is prepared.

[Addendum 8] In several implementation examples, the fixedly mounting step may include a step of bringing the heat storage material container (61; 111; 121) and the container mount (56) into close contact over a contact area.

The embodiment disclosed this time should be considered illustrative in all aspects, rather than restrictive. The scope of the present invention is represented not by the meaning described above, but by claims and is intended to include all changes in the scope of claims and in the meaning and scope of equivalents.

LIST OF REFERENCE NUMERALS

V vehicle
10 vehicle-side connector
20 connector housing
30 housing body
31 fitting portion
31A receptacle
31B back wall portion
32 flange portion
32X mounting hole
33 tube portion
34 terminal accommodating portion
35 terminal holding portion
40 retainer
41 base portion
42 peripheral wall
43 terminal pressing portion
44 wire holding portion
45 surrounding wall portion
50 vehicle-side terminal
51, 51A, 51B terminal connecting portion
52 base portion
53 tubular connecting portion
53A resilient piece
53X slit
54 wire connecting portion
55 locking portion
56 holding portion
57 accommodation space
58 holding portion
60, 110, 120 heat storage body
61, 111, 121 case
62, 112, 122 case body
63, 113, 123 cover
64, 114, 124 accommodating portion
65 heat storage material
70 wire
71 core
72 insulation coating
80 charger-side connector
81 connector housing
82 charger-side terminal
90 holding portion
91 bottom wall
92 projecting piece
100 holding portion
101 bottom wall
102 side wall
102X recess
104 accommodation space
113A engaging portion
126 engaging portion
126A engaging claw

What is claimed is:

1. A connection terminal, comprising:
a terminal made of metal; and
a heat storage body including a case held in or on the terminal, a heat storage material being accommodated inside the case,
wherein:
the case includes a front end and a rear end opposite the front end,
the terminal includes:
a terminal connecting portion to be electrically connected to a mating terminal;
a wire connecting portion to be electrically connected to a wire; and
a holding portion integrally formed to and positioned between the terminal connecting portion and the wire connecting portion,
the terminal connecting portion, the holding portion, and the wire connecting portion are linearly aligned in a row along a front to rear direction, and
the case is held in or on the holding portion such that the front end of the case faces a rear end of the terminal connecting portion and the rear end of the case faces the wire connecting portion.

2. The connection terminal of claim 1, wherein the heat storage body is held inside the holding portion.

3. The connection terminal of claim 1, wherein the case is made of a thermally expandable material.

4. The connection terminal of claim 1, wherein:
the holding portion is formed into a tubular shape, and
the heat storage body is provided in an internal space of the holding portion.

5. The connection terminal of claim 1, wherein:
the holding portion includes a projecting piece projecting in a direction intersecting an arrangement direction of the terminal connecting portion and the wire connecting portion, and
the holding portion holds the heat storage body by crimping the projecting piece to an outer surface of the heat storage body.

6. The connection terminal of claim 1, wherein:
the holding portion includes a bottom wall extending between the terminal connecting portion and the wire connecting portion and a side wall standing on the bottom wall, and
the heat storage body includes an engaging portion to be engaged with the side wall.

7. The connection terminal of claim 1, wherein the terminal connecting portion includes a base portion and a locking portion, the locking portion being positioned between the base portion and the wire connecting portion, and a diameter of an outer peripheral surface of locking portion being greater than a diameter of an outer peripheral surface of the base portion.

8. A connector, comprising:
the connection terminal of claim 1; and
a connector housing for holding the connection terminal.

* * * * *